Aug. 26, 1947.  H. TURKEL  2,426,535

INFUSION AND BIOPSY NEEDLE

Filed Oct. 21, 1944

INVENTOR.
HENRY TURKEL.
BY Robert A. Sloman
ATTORNEY.

Patented Aug. 26, 1947

2,426,535

UNITED STATES PATENT OFFICE 2,426,535

INFUSION AND BIOPSY NEEDLE

Henry Turkel, Detroit, Mich.

Application October 21, 1944, Serial No. 559,739

1 Claim. (Cl. 128—2)

The injection of fluids into a peripheral vein may be impossible or technically impractical for a variety of reasons, such as extensive burns or circulatory collapse. In such circumstances it is possible, safe and efficacious to administer the fluid into the medullary space of the sternum. For this purpose a number of instruments have been devised.

Although the value of intramedullary injections is widely recognized, certain difficulties and disadvantages have been encountered in the use of methods heretofore employed. These include: local abscesses, subcutaneous infections and osteomyelitis; penetration of the needle into the mediastinum by the use of uncontrollable force; breaking of the anterior lamella of the sternum into small particles, which obstructed the lumen of the needle and induced clot formation, leakage around the needle and accidental dislodgment of the needle while the infusion was in progress.

All the above obstacles may be eliminated by the use of the instrument and method hereinafter described.

The instrument differs from others in that by its use a core is removed from the anterior lamella of the sternum, an aperture being left through which the infusion needle may be introduced easily and with slight force. The presence of this channel into the medullary space eliminates the "uncontrollable" physical force required to push a needle through the anterior sternal plate and thus prevents the danger of penetration of the needle through the sternum and into the mediastinum. Since the core of bone with adherent marrow is removed, there are no bony fragments remaining to cause possible obstruction or promote local clot formation; thus the necessity of flushing the needle and marrow cavity is obviated.

It is therefore the object of the present invention to provide a new and simple instrument for administration of fluids through bone marrow.

It is the further object of the present invention to provide a new and simple instrument for obtaining subcutaneous or deep seated tissue or bone specimens for analysis and microscopic examination.

Other objects will be seen from the following specification and claim which describe the invention in relation to the various elements and their combinations as illustrated in the accompanying drawing of which—

Fig. 1 is an elevational view of the outer needle.

Fig. 2 is an elevational view of the stylet therefor.

Fig. 3 is an elevational section of the outer needle and its stylet.

Fig. 4 is a plan view of the same.

Fig. 5 is an elevational view of the inner cutting needle.

Fig. 6 is an elevational view of its stylet.

Fig. 7 is an elevational section of the inner cutting needle and its stylet.

Fig. 8 is an elevational view of the outer needle variously positioned to show the method of using the instrument for infusions.

Fig. 9 is an enlarged fragmentary section of the end of the cutting needle.

Fig. 10 is an enlarged fragmentary section of a different type end of cutting needle.

Fig. 11 is a similar view of still another variation.

Fig. 12 is a similar view of a still different variation thereof.

Fig. 13 is a bottom plan view of Fig. 12.

Fig. 14 is a fragmentary elevational view showing a different type of cutting end for the cutting needle.

Fig. 15 is a fragmentary front elevational view of the same.

Fig. 16 is a fragmentary elevational section thereof; and

Fig. 17 is a fragmentary elevational section of a different type of cutting end.

It will be understood that the above drawing illustrates merely preferable embodiments of the invention and that others are contemplated within the scope of the claim hereunder.

In the drawing Figs. 1–4 the outer needle and its stylet are shown. The outer needle comprises a hub 1 and a tube 2 projecting therefrom having an outer sharp beveled point 3, its other end fitting within the shoulder 4 of said hub.

The upper part of the hub has a hollow head 5, which is tapered at 6 for insertion of a standard adaptor 25 as shown in Fig. 8 or for receiving a syringe or irrigation attachment.

A slot 7, Fig. 3, is formed in head 5 into which fits the projection 8 of head 26 of stylet 27, so as to align the point of the needle 3 with the point 9 of said stylet, thus keeping them at the same cutting or bevel angle 10.

A needle tip indicating slot 11 is formed within head 5 aligned longitudinally with the pointed end of needle tip 3. A corresponding tip indicating slot 13 is also formed in shoulder 4 in line with slot 11 and said needle point.

The central portion 12 of the needle hub is slightly tapered on its lower end adjacent said shoulder to facilitate handling of the needle when it is pushed through bony structure.

Shoulder 4 has 45 degree sides preferably; however any other suitable angle or angles may be employed; and said angular surface is adapted to be parallel to the skin, thereby accurately indicating the correct angle of insertion of the needle.

The purpose of the outer guiding needle is to cut through the skin and subcutaneous tissue without excising them and to direct the inner cutting needle to the desired position.

Referring to Figs. 5, 6 and 7 the hollow internal cutting needle 28 is shown with its outside diameter equal to that of the outer needle stylet 27, being adapted for insertion in said outer needle on removal of said stylet.

Needle 28 has preferably a 6 mm. long graduated neck 16 intermediate its shank and the hollow knurled handle 18. It is understood however that any other suitable length could be used. The shank of the needle 28 is of the proper length so that when its cutting tip 15 reaches the bevel 10 of the outer needle, the 6 mm. long graduated neck 16 just touches the head 5 of the outer needle.

When the entire neck 16 is completely within the head of the outer needle, the inner cutting tip 15 projects 6 mm. beyond bevel 10 of the outer needle.

Said tip 15 comprises a plurality, preferably four, saw-like cutting teeth 14 which are adapted to cut into tissue as needle 28 is rotated by handle 18.

The interior surface of the tip 15 is cone shaped or converging at 29 as shown in Fig. 9 so that bony or other tissue cut becomes wedged into the end of needle 28 and remains within the needle when the same is removed from the body.

Where wider holes are contemplated the compression ratio of the inner diameter of the cutting needle to the width of the cutting tip 15 may be insufficient to compress the tissue cut for retaining it within the end of the inner needle. Thus such cut tissue slides out of the needle tip as it is removed.

In order to retain such tissue a continuous threaded portion 30 is formed within the end of needle 28 adjacent the converging portion 29 as illustrated in Fig. 10. Said threaded portions may be close together or wide apart.

Threads 30 thus form a gripping means which cooperate with the inner converging end portion 29 for firmly retaining the tissue cut as the cutting needle is withdrawn.

Fig. 11 shows a slightly different form wherein a plurality of tissue retaining means 31 project inwardly from the inner surface of the cutting needle adjacent its inwardly converging portion 29.

A still different form of inner end of cutting needle is shown in Fig. 12 wherein flexible arcuate leaves 37 are joined at points 38 within the converging portion 29 of needle 28. Rotation of the needle clockwise as indicated causes the leaves to merely follow, assuming a peripheral position, while the tissue cut becomes wedged in the converging portion of the cutting needle. When the tissue tends to fall or pull out through the lower opening of the cutting needle, as the needle is removed, leaves 37 would be pulled centerwise to prevent the tissue from coming out. Rotation of the needle in the opposite direction would also cause the ends of leaves 37 to move centerward for retaining the cut tissue within the end of the needle.

The hollow hub 17 of the internal cutting needle is adapted to receive the head 19 of the cutting needle stylet 20. The stem thereof is slightly longer than shaft 28 of the cutting needle so that when inserted therethrough its end 34 extends through tip 14 of said needle. Stylet 20 is thus employed for ejecting or expressing the core of cut tissue out of the cutting needle.

As stylet 20 stays within the cutting needle as the latter is inserted into the outer guide needle, Fig. 1, it is seen that said stylet protects the cutting tip 15 from being accidentally bent during insertion.

Hollow hub 17 is also adapted to cooperatively receive a standard syringe or the adapter 25 shown in Fig. 8 for infusions, transfusions, or irrigations, insertions of drugs, radium, etc.

The outer needle and stylet, Fig. 3, are pierced through the skin until the bone is reached, then stylet 27 is replaced by inner cutting needle 28, which drills a hole through the anterior lamella and retains the entire core instead of breaking it up into particles. The outer needle is then pushed a predetermined distance into the prepared hole with little force. The inner needle 28 is removed; and after the presence of the tip of the outer needle in the sternal cavity has been verified by aspiration with a syringe, the instrument is ready for infusion as shown in Fig. 8.

For the actual infusion the outer needle angular shoulder 4 rests parallel to and against the skin. However in many instances where the outer needle is not to be inserted its full length, dry cotton or gauze 35 is placed between said shoulder and the skin. In order to prevent that the outer needle is not accidentally dislodged or moved, tape 36 is employed provisioned around the body and the top part of shoulder 4 of the outer needle for immovably retaining the same.

The use of cutting needle 28 within guide needle 1—2 guarantees making a close fit opening into body spaces or sinuses or abscesses which is advantageous for irrigation and instillation of fluids and drugs.

A slightly different type of cutting end for hollow cutting needle 28 is illustrated in Figs. 14 through 17.

Fig. 14 shows the cutting needle beveled at its end as at 39 providing an approximate elliptical opening for receiving the tissue specimen. In Fig. 14 it is noted that one edge 40 is sharp to act as a cutting blade as needle 28 is rotated within guide needle 2 for cutting tissue or bone.

It is also contemplated that the opposite edge 41 may also be sharp as shown in Fig. 17, to provide two cutting edges.

However, in Figs. 15 and 16 the needle is shown with only one cutting edge 40 and with the other edge 42 relatively blunt.

Furthermore it is contemplated as in Fig. 16 that at least one portion 43 of the inner surface of the cutting end be inwardly converging as shown in section in Fig. 16, for firmly wedging within the end of the needle the cut tissue, bone, or marrow specimen.

However, in Fig. 17 the needle is inwardly converging at 44 throughout its entire interior surface adjacent the sharp cutting edges 40 and 41 for firmly wedging in the cut specimen or tissue to be removed.

Referring to Fig. 4, tapered portion 3 is also beveled at 3' to facilitate progressive entry of outer needle 2 into the aperture cut out or formed by inner needle 28, as the latter is manually rotated within said outer needle.

Having described my invention, reference should now be had to the claim which follows for determining the scope thereof.

I claim:

An infusion and biopsy instrument comprising a hollow shaft, cutting means on the end thereof, an inwardly converging interior adjacent said cutting means, and a plurality of tissue retaining means pivotally mounted within said shaft adjacent said converging interior.

HENRY TURKEL.

REFERENCES CITED

The following references are of record in the file of this patent:

UNITED STATES PATENTS

| Number | Name | Date |
|---|---|---|
| 1,585,934 | Muir | May 25, 1926 |
| 1,867,624 | Hoffman | July 19, 1932 |
| 2,198,319 | Silverman | Apr. 23, 1940 |
| 2,219,605 | Turkel | Oct. 29, 1940 |